(12) United States Patent
Nashef et al.

(10) Patent No.: US 7,886,631 B2
(45) Date of Patent: Feb. 15, 2011

(54) ADJUSTABLE STEERING COLUMN ASSEMBLY

(75) Inventors: Samuel Nashef, Portage, MI (US); Damir Menjak, Frankenmuth, MI (US)

(73) Assignee: Nexteer (Beijing) Technology Co., Ltd.

( * ) Notice: Subject to any disclaimer, the term of this patent is extended or adjusted under 35 U.S.C. 154(b) by 286 days.

(21) Appl. No.: 12/262,287

(22) Filed: Oct. 31, 2008

(65) Prior Publication Data

US 2009/0114056 A1    May 7, 2009

Related U.S. Application Data

(60) Provisional application No. 61/001,332, filed on Nov. 1, 2007.

(51) Int. Cl.
B62D 1/18    (2006.01)
(52) U.S. Cl. .......................................... 74/493; 280/775
(58) Field of Classification Search ................... 74/492, 74/493; 280/775
See application file for complete search history.

(56) References Cited

U.S. PATENT DOCUMENTS

| | | | |
|---|---|---|---|
| 4,752,085 A * | 6/1988 | Yamamoto | .................. 280/775 |
| 5,078,022 A | 1/1992 | Ichikawa | |
| 5,730,465 A | 3/1998 | Barton et al. | |
| 5,761,966 A | 6/1998 | Cuiller et al. | |
| 6,036,228 A | 3/2000 | Olgren et al. | |
| 6,131,481 A | 10/2000 | Wilson et al. | |
| 6,301,990 B1 | 10/2001 | Lewis | |
| 6,543,807 B2 | 4/2003 | Fujiu et al. | |
| 6,659,504 B2 | 12/2003 | Riefe et al. | |
| 6,851,331 B2 | 2/2005 | Kuroumaru et al. | |
| 7,083,198 B2 | 8/2006 | Lee | |
| 7,328,917 B2 | 2/2008 | Sawada et al. | |
| 7,743,681 B2 * | 6/2010 | Manwaring et al. | ........... 74/498 |
| 2003/0226943 A1 | 12/2003 | Laisement et al. | |
| 2004/0239089 A1 * | 12/2004 | Armstrong et al. | .......... 280/775 |

FOREIGN PATENT DOCUMENTS

EP    0 849 141 A1    6/1998
FR    2 778 704 A1    11/1999

* cited by examiner

*Primary Examiner*—Richard W Ridley
*Assistant Examiner*—Terence Boes
(74) *Attorney, Agent, or Firm*—Cantor Colburn LLP

(57) ABSTRACT

An adjustable steering column assembly including a column jacket moveable in at least one of a telescoping direction and a raking direction is disclosed. First and second gears are coupled to a rake bracket and mesh with each other with the first gear rotatable about a first pivot axis transverse to a longitudinal axis and the second gear rotatable about a second pivot axis transverse to the longitudinal axis and spaced above the first pivot axis such that rotation of the first gear causes rotation of the second gear. A cam mechanism is coupled to the rake bracket and to each of the first and second gears with the cam mechanism movable along the first and second pivot axes during rotation of the first and second gears for selectively engaging the rake bracket to prevent movement of the column jacket in at least one of the telescoping and raking directions.

18 Claims, 4 Drawing Sheets

ADJUSTABLE STEERING COLUMN ASSEMBLY

CROSS REFERENCE TO RELATED APPLICATION

This application claims the benefit of U.S. Provisional Patent Application Ser. No. 61/001,332 filed on Nov. 1, 2007, the disclosure of which is hereby incorporated by reference.

BACKGROUND OF THE INVENTION

1. Field of the Invention

The present invention relates to an adjustable steering column assembly for a vehicle.

2. Description of the Prior Art

Vehicles may be equipped with an adjustable steering column assembly including a column jacket that adjusts a position of a steering wheel to enhance the comfort and safety of a driver within a vehicle compartment. For example, the column jacket may be adjusted in a telescoping direction for moving the steering wheel closer to and away from the driver and/or the column jacket may be adjusted in a raking direction to move the steering wheel up and down relative to the driver. In other words, the column jacket defines a longitudinal axis with the column jacket moveable along the longitudinal axis for movement in the telescoping direction and/or the column jacket is moveable transverse to the longitudinal axis for movement in the raking direction. These features cooperate to enable the driver to adjust the steering wheel to a desired, convenient position for operating the vehicle and for enabling the steering wheel to be moved out of the way to provide greater access to getting into and out of the driver's seat of the vehicle.

Typically the column jacket is mounted to a telescope bracket and a rake bracket is coupled to the telescope bracket with the rake bracket mounted to the vehicle for supporting the assembly. The telescope bracket defines a telescoping slot along the longitudinal axis for allowing movement of the column jacket in the telescoping direction. The rake bracket defines a raking slot transverse to the longitudinal axis for allowing movement of the column jacket in the raking direction. When the driver applies a force (e.g. pushing or pulling) to the steering wheel which is off-center from the longitudinal axis during adjustments (e.g. the driver is applying the force at a top or a bottom of the steering wheel), a reaction force is applied to the telescoping slot which is off-center from the longitudinal axis thus causing the column jacket to bind or catch during adjustments.

In addition, the telescope bracket flanks the column jacket and the rake bracket flanks both the telescope bracket and the column jacket. A bolt is disposed through the telescoping and raking slots below the column jacket relative to the longitudinal axis. A locking mechanism is coupled to the bolt below the column jacket for selectively allowing and preventing movement of the column jacket in the telescoping and raking directions. Having the bolt, the locking mechanism, and the telescope and rake brackets disposed below the column jacket reduces an amount of open space in the driver's knee area within the vehicle compartment. In other words, the adjustable steering column assembly is bulky, heavy, and consumes a large amount of space in the vehicle compartment. Hence, the driver may be injured, particularly within the driver's knee area, because the reduced amount of open space causes the driver to impact the adjustable steering column assembly during a collision.

Therefore there remains a need to develop an adjustable steering column assembly that increases an amount of open space in a vehicle compartment for preventing injury to a driver during a collision while also preventing binding and/or catching of the column jacket during adjustments.

SUMMARY OF THE INVENTION AND ADVANTAGES

The present invention provides for an adjustable steering column assembly for a vehicle including a column jacket defining a longitudinal axis and moveable in at least one of a telescoping direction and a raking direction. The adjustable steering column assembly includes a telescope bracket with the column jacket mounted thereon and a rake bracket coupled to the telescope bracket. A first gear is coupled to the rake bracket and defines a first pivot axis transverse to the longitudinal axis. The first gear is rotatable about the first pivot axis and includes a plurality of teeth. A second gear includes a plurality of teeth meshing with the teeth of the first gear. The second gear defines a second pivot axis transverse to the longitudinal axis and spaced above the first pivot axis with the second gear coupled to the rake bracket and rotatable about the second pivot axis such that rotation of the first gear about the first pivot axis causes rotation of the second gear about the second pivot axis. The adjustable steering column assembly further includes a cam mechanism coupled to the rake bracket and to each of the first and second gears with the cam mechanism movable along the first and second pivot axes during rotation of the first and second gears for selectively engaging the rake bracket to prevent movement of the column jacket in at least one of the telescoping and raking directions.

The present invention therefore provides for an adjustable steering column assembly that increases an amount of open space within a vehicle compartment for preventing injury to a driver and/or the driver's knee area during a collision. In addition, weight and bulkiness of the adjustable steering column assembly is reduced with this design. Further, the adjustable steering column assembly provides for a more stable column jacket which prevents binding and/or catching of the column jacket during adjustments. Additionally, having a cam mechanism coupled to each of the first and second gears increases an amount of surface area applying a clamping pressure to a rake bracket for preventing movement of the column jacket.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION OF THE INVENTION

Referring to the Figures, wherein like numerals indicate like or corresponding parts throughout the several views, an adjustable steering column assembly 10 for a vehicle (not shown) is generally shown in FIGS. 1-4.

Figure 1:
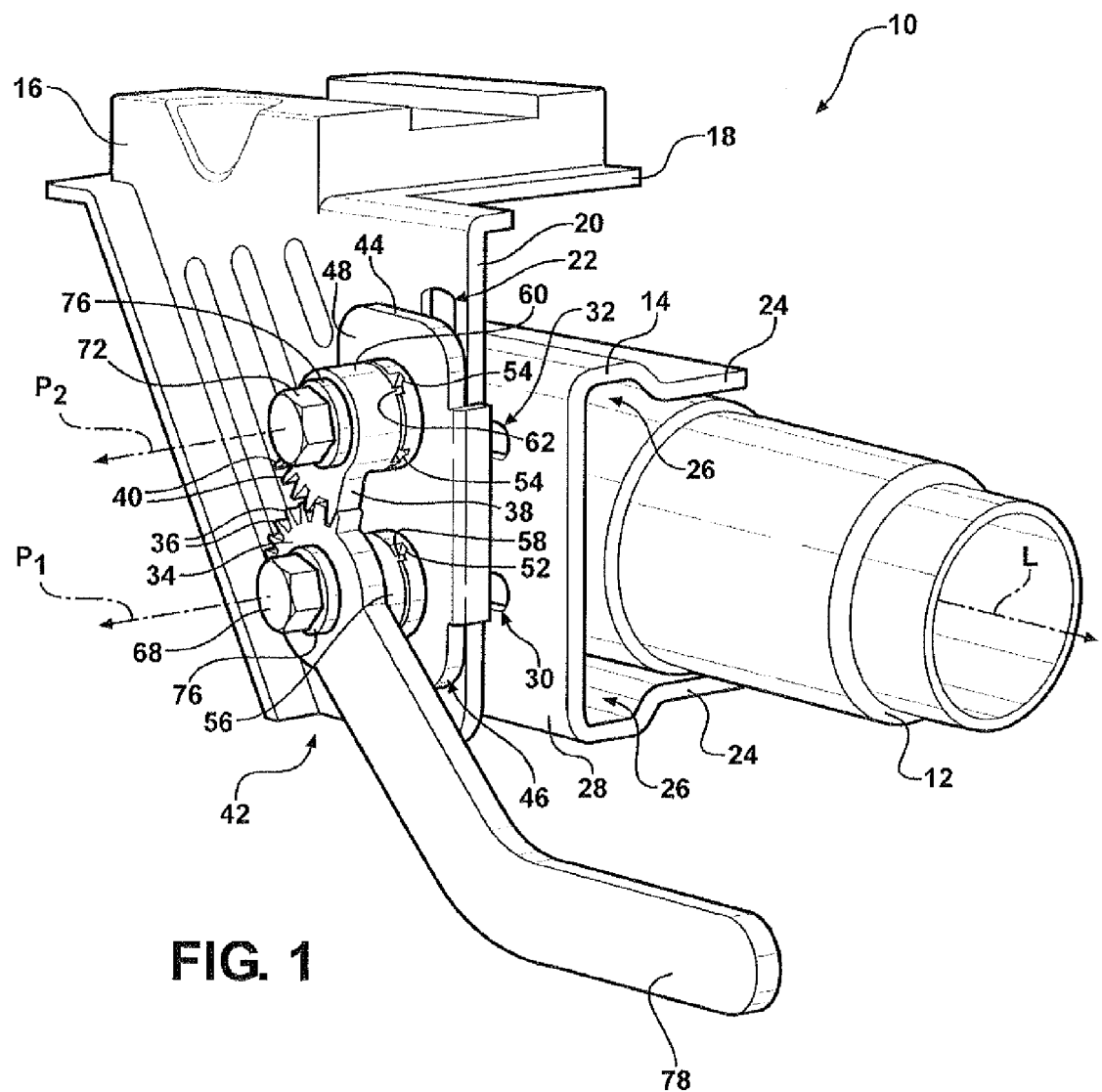
FIG. 1 is a perspective view of an adjustable steering column assembly with a lever in a set position.
Figure 2:
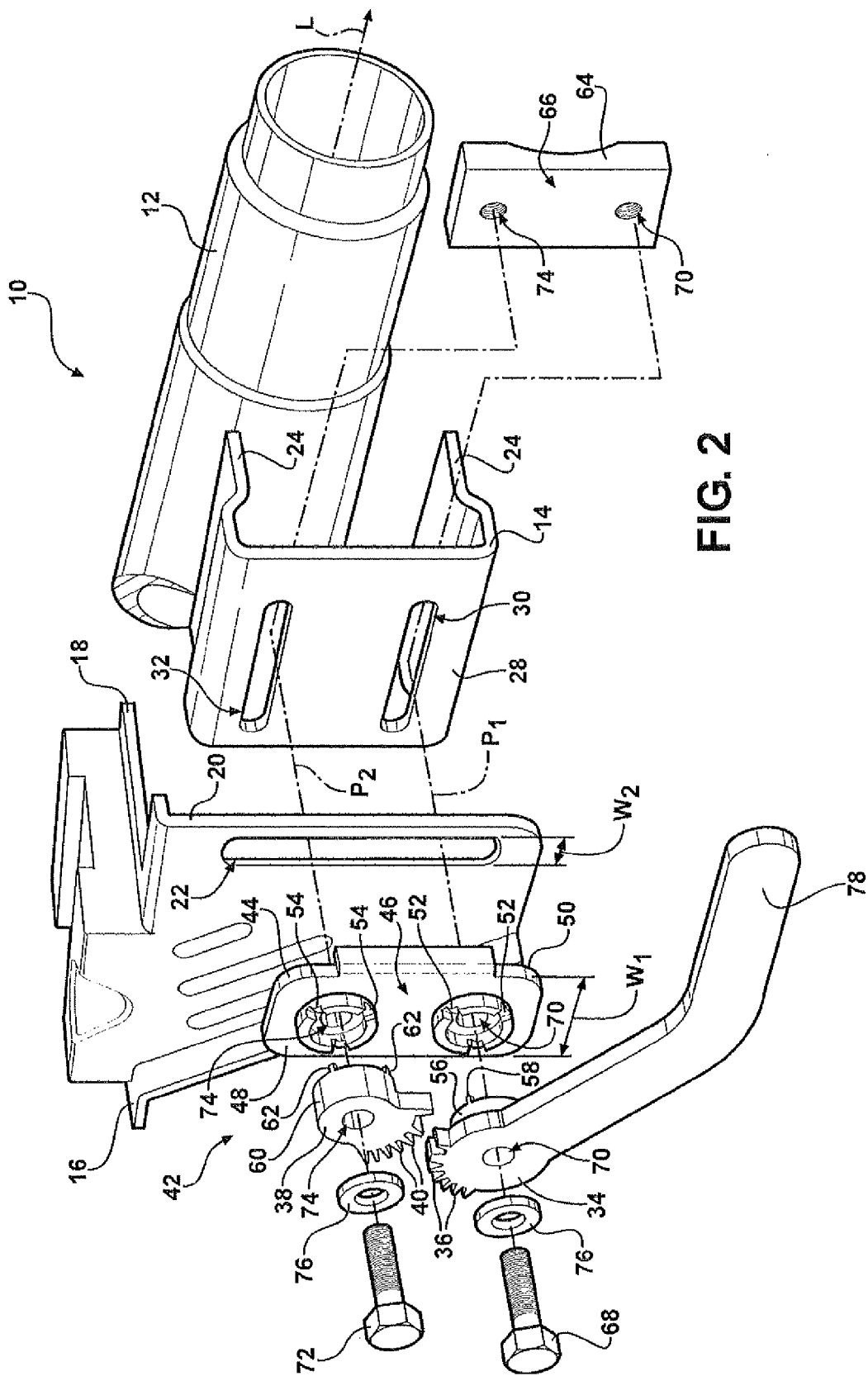
FIG. 2 is an exploded view of the adjustable steering column assembly.
Figure 3:
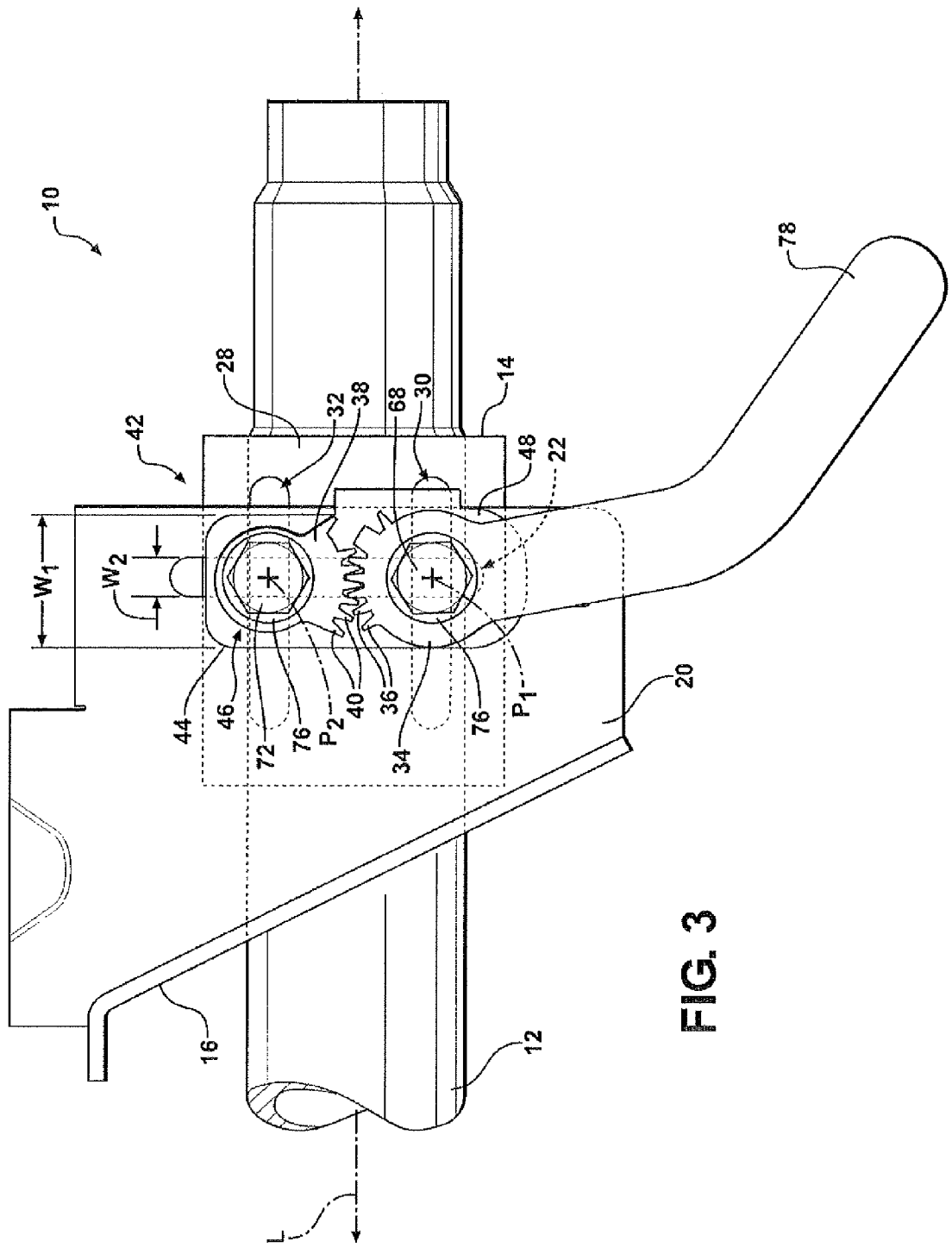
FIG. 3 is a side view of the adjustable steering column assembly with the lever in an adjustment position.

Referring to FIGS. 1-3, the adjustable steering column assembly 10 includes a column jacket 12 defining a longitudinal axis L and moveable in at least one of a telescoping direction and a raking (tilting) direction. A steering wheel (not shown) is coupled to the column jacket 12 for allowing a driver to adjust the column jacket 12 in at least one of the telescoping and raking directions within a vehicle compartment (not shown). The column jacket 12 moves along the longitudinal axis L for the telescoping direction and the column jacket 12 moves transverse to the longitudinal axis L for the raking direction. In other words, the steering wheel moves closer to and away from the driver when adjusting the telescoping direction and the steering wheel moves up and down relative to the driver when adjusting the raking direction. Typically, the column jacket 12 moves in both the telescoping and raking directions. It is to be appreciated that the column jacket 12 may move only in the telescoping direction or only in the raking direction.

Figure 4:
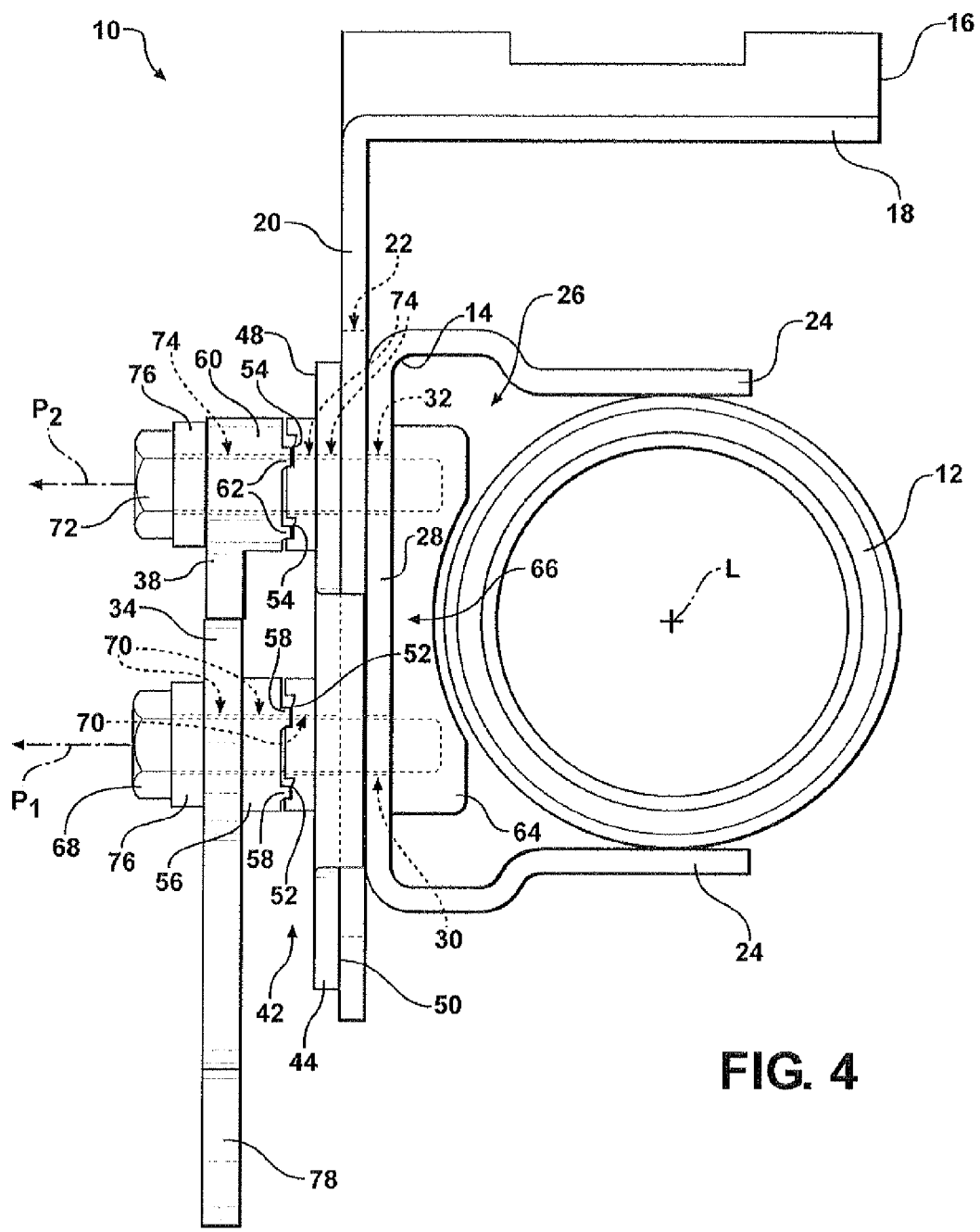
FIG. 4 is an end view of the lever in the set position with an unitary cam member and a back plate clamping a telescope bracket and a rake bracket together.

The adjustable steering column assembly 10 further includes a telescope bracket 14 with the column jacket 12 mounted thereon and a rake bracket 16 coupled to the telescope bracket 14. The rake bracket 16 is mounted to the vehicle and supports the telescope bracket 14 and the column jacket 12. More specifically, the rake bracket 16 includes a horizontal portion 18 and a vertical portion 20 extending downwardly relative to the horizontal portion 18 with the horizontal portion 18 mounted to the vehicle and the telescope bracket 14 coupled to the vertical portion 20. The vertical portion 20 defines at least one raking slot 22 extending transverse to the longitudinal axis L for allowing movement of the column jacket 12 in the raking direction. As best shown in FIG. 4, the vertical portion 20 is disposed along one side of the column jacket 12. In other words, the vertical portion 20 fails to encircle the column jacket 12 on opposing sides which reduces weight and bulkiness of the adjustable steering column assembly 10. Having the vertical portion 20 disposed along one side of the column jacket 12 increases an amount of open space within the vehicle compartment for preventing injury to the driver and/or the driver's knee area during a collision. The telescope bracket 14 and the column jacket 12 move independently of the rake bracket 16 when moving in the telescoping and/or raking directions.

The telescope bracket 14 includes a pair of arms 24 flanking and mounted to the column jacket 12 to define a gap 26 between the arms 24 and the column jacket 12. More specifically, the telescope bracket 14 includes a base portion 28 coupled to the rake bracket 16 with the arms 24 extending outwardly away from the base portion 28 in a spaced relationship. The base portion 28 and the vertical portion 20 are configured to complement each other such that the telescope bracket 14 is moveable relative to the rake bracket 16. One of the arms 24 is disposed above the telescope bracket 14 and an other one of the arms 24 is disposed below the telescope bracket 14. Below the arm 24 disposed under the telescope bracket 14 is open space, thus the adjustable steering column assembly 10 increases the amount of open space in the vehicle compartment for preventing injury to the driver and/or the driver's knee area during the collision.

Referring back to FIGS. 1-3, the base portion 28 selectively engages the rake bracket 16 and defines at least one telescoping slot 30 extending along the longitudinal axis L. More specifically, the at least one telescoping slot 30 is further defined as a first telescoping slot 30 and further includes a second telescoping slot 32 spaced above the first telescoping slot 30. In other words, the second telescoping slot 32 is disposed above the first telescoping slot 30 relative to the longitudinal axis L in a generally parallel relationship such that the column jacket 12 may be adjusted in the telescoping direction. By having the first and second telescoping slots 30, 32 spaced from each other as disclosed, the column jacket 12 is more stable and thus prevents binding or catching of the column jacket 12 during adjustments. When the driver applies a force (e.g. pushing or pulling) to the steering wheel which is off-center from the longitudinal axis L during adjustments (e.g. the driver is applying a force at a top or a bottom of the steering wheel), a reaction force is applied to both the first and second telescoping slots 30, 32 which are off-center from the longitudinal axis L. Both of the first and second telescoping slots 30, 32 absorb this off-center reaction force in the spaced relationship which stabilizes the column jacket 12 and prevents binding or catching of the column jacket 12 during adjustments.

A first gear 34 is coupled to the rake bracket 16 and defines a first pivot axis $P_1$ transverse to the longitudinal axis L. The first gear 34 is rotatable about the first pivot axis $P_1$ and includes a plurality of teeth 36. A second gear 38 is coupled to the rake bracket 16 and includes a plurality of teeth 40 meshing with the teeth 36 of the first gear 34. The second gear 38 defines a second pivot axis $P_2$ transverse to the longitudinal axis L and spaced above the first pivot axis $P_1$. The second gear 38 is rotatable about the second pivot axis $P_2$ such that rotation of the first gear 34 about the first pivot axis $P_1$ causes rotation of the second gear 38 about the second pivot axis $P_2$. More specifically, the first and second pivot axes $P_1$, $P_2$ are generally parallel to each other transverse to the longitudinal axis L with the second pivot axis $P_2$ spaced above the first pivot axis $P_1$. In other words, the first and second pivot axes $P_1$, $P_2$ are generally parallel each other such that the first and second gears 34, 38 rotate relative to each other without causing the first and second gears 34, 38 to bind or catch during rotation.

The first and second gears 34, 38 move simultaneously or in unison such that the first gear 34 rotates about the first pivot axis $P_1$ in a first direction and the second gear 38 rotates about the second pivot axis $P_2$ in a second direction opposite the first direction. In other words, if the first gear 34 rotates clockwise then the second gear 38 will rotate counter-clockwise and if the first gear 34 rotates counter-clockwise then the second gear 38 will rotate clockwise. Optionally, one of the teeth 36, 40 of one of the first and second gears 34, 38 may be configured differently from the other teeth 36, 40 for preventing additional travel of the first and second gears 34, 38, as best shown in FIG. 3.

Also referring to FIGS. 1 and 2, a cam mechanism 42 is coupled to the rake bracket 16 and to each of the first and second gears 34, 38. The cam mechanism 42 is movable along the first and second pivot axes $P_1$, $P_2$ during rotation of the first and second gears 34, 38 for selectively engaging the rake bracket 16 to prevent movement of the column jacket 12 in at least one of the telescoping and raking directions. In other words, the cam mechanism 42 frictionally engages the rake bracket 16 to prevent movement of the column jacket 12. Having the cam mechanism 42 coupled to each of the first and second gears 34, 38 increases an amount of surface area applying a clamping pressure to the rake bracket 16 when preventing movement of the column jacket 12. It is to be appreciated that a plurality of cam mechanisms 42 may be utilized such that one of the cam mechanisms 42 is coupled to the first gear 34 and an other one of the cam mechanisms 42 is coupled to the second gear 38. If a plurality of cam mechanisms 42 are utilized, each of the cam mechanisms 42 move simultaneously or in unison along the first and second pivot axes $P_1$, $P_2$ respectively, in response to rotation of the first and second gears 34, 38.

The cam mechanism 42 includes a unitary cam member 44 defining an elongated configuration 46 extending radially relative to the first and second pivot axes $P_1$, $P_2$. The unitary cam member 44 is coupled to each of the first and second gears 34, 38. In other words, the unitary cam member 44 extends between and around both the first and second gears 34, 38. The unitary cam member 44 defines a first width $W_1$ and the raking slot 22 defines a second width $W_2$ with the first width $W_1$ greater than the second width $W_2$ for allowing the unitary cam member 44 to engage the vertical portion 20 of the rake bracket 16. The unitary cam member 44 includes a first side 48 and a second side 50 opposing each other relative to the first and second pivot axes $P_1$, $P_2$. The first side 48 faces the first and second gears 34, 38 and the second side 50 faces the rake bracket 16. The second side 50 is complementary in configuration to the rake bracket 16 such that the second side 50 is moveable relative to the rake bracket 16 when adjusting the column jacket 12 and engages the rake bracket 16 when preventing movement of the column jacket 12. The elongated configuration 46 and the first width $W_1$ of the unitary cam member 44 increases the amount of surface area the unitary cam member 44 frictionally engages on the rake bracket 16 when preventing movement of the column jacket 12.

The unitary cam member 44 further includes a plurality of first cam surfaces 52 spaced from each other about the first pivot axis $P_1$. The unitary cam member 44 further includes a plurality of second cam surfaces 54 spaced from each other about the second pivot axis $P_2$ and spaced from the first cam surfaces 52. More specifically, the first and second cam surfaces 52, 54 face outwardly away from the rake bracket 16. In other words, the first and second cam surfaces 52, 54 extend outwardly from the first side 48 of the unitary cam member 44. It is to be appreciated that the first cam surfaces 52 may be spaced an equal distance away from each other about the first pivot axis $P_1$ and the second cam surfaces 54 may be spaced an equal distance away from each other about the second pivot axis $P_2$. It is to be further appreciated that one first cam surface 52 may be utilized instead of the plurality of first cam surfaces 52 and one second cam surface 54 may be utilized instead of the plurality of second cam surfaces 54.

The cam mechanism 42 further includes a first follower 56 mounted to the first gear 34 and having a plurality of first extensions 58 extending along the first pivot axis $P_1$. In other words, the first extensions 58 extend outwardly away from the first gear 34 along the first pivot axis $P_1$. Each of the first extensions 58 engage one of the first cam surfaces 52 such that rotation of the first gear 34 allows the first extensions 58 to move along the first cam surfaces 52 for moving the unitary cam member 44 along the first pivot axis $P_1$. It is to be appreciated that the first gear 34 and the first follower 56 may be integrally formed to each other or the first follower 56 may be affixed to the first gear 34 by any suitable method, such as welding, adhesive, etc.

The cam mechanism 42 also includes a second follower 60 mounted to the second gear 38 and having a plurality of second extensions 62 extending along the second pivot axis $P_2$. In other words, the second extensions 62 extend outwardly away from the second gear 38 along the second pivot axis $P_2$. Each of the second extensions 62 engage one of the second cam surfaces 54 such that rotation of the second gear 38 allows the second extensions 62 to move along the second cam surfaces 54 for moving the unitary cam member 44 along the second pivot axis $P_2$. It is to be appreciated that the second gear 38 and the second follower 60 may be integrally formed to each other or the second follower 60 may be affixed to the second gear 38 by any suitable method, such as welding, adhesive, etc. It is to be also appreciated that one first extension 58 may be utilized to engage the one first cam surface 52 and one second extension 62 may be utilized to engage the one second cam surface 54.

The first and second followers 56, 60 and the first and second cam surfaces 52, 54 cooperate to allow the unitary cam member 44 to evenly move along the first and second pivot axes $P_1$, $P_2$ such that the clamping pressure is evenly applied to the rake bracket 16 when preventing movement of the column jacket 12. The first and second followers 56, 60 and the first and second cam surfaces 52, 54 also cooperate to increase frictional engagement between the unitary cam member 44 and the rake bracket 16 because two separate areas are applying the clamping pressure. In addition, having the second follower 60 and the second cam surfaces 54 disposed above the first follower 56 and the first cam surfaces 52 aids in resisting vertical torqueing of the column jacket 12 when forces are applied to the steering wheel by the driver.

As best shown in FIG. 4, the adjustable steering column assembly 10 further includes at least one back plate 64 disposed between the column jacket 12 and the telescope bracket 14 with the back plate 64 coupled to the unitary cam member 44. More specifically, the back plate 64 is disposed in the gap 26 between the arms 24 of the telescope bracket 14 and the column jacket 12. The back plate 64 is complementary in configuration to the base portion 28 of the telescope bracket 14 such that the back plate 64 and the base portion 28 are moveable relative to each other when adjusting the column jacket 12 and engages the base portion 28 when preventing movement of the column jacket 12. The back plate 64 defines an elongated configuration 66 for increasing frictional engagement between the base portion 28 of the telescope bracket 14 when preventing movement of the column jacket 12. It is to be appreciated that a plurality of back plates 64 may be disposed in the gap 26 between the arms 24 of the telescope bracket 14 and the column jacket 12 such that one of the back plates 64 is disposed along the first pivot axis $P_1$ and an other one of the back plates 64 is disposed along the second pivot axis $P_2$ with each of the back plates 64 coupled to the unitary cam member 44.

Also referring to FIG. 2, a first bolt 68 is disposed along the first pivot axis $P_1$ and through the telescope and rake brackets 14, 16 for coupling the first gear 34 to the cam mechanism 42, the back plate 64 and the telescope and rake brackets 14, 16. More specifically, the first gear 34, the first follower 56, the unitary cam member 44, and the back plate 64 define a first aperture 70 disposed along the first pivot axis $P_1$ for receiving the first bolt 68. A second bolt 72 is disposed along the second pivot axis $P_2$ and through the telescope and rake brackets 14, 16 for coupling the second gear 38 to the cam mechanism 42, the back plate 64 and the telescope and rake brackets 14, 16. More specifically, the second gear 38, the second follower 60, the unitary cam member 44, and the back plate 64 define a second aperture 74 disposed along the second pivot axis $P_2$ for receiving the second bolt 72. The telescoping slot 30 of the telescope bracket 14 receives one of the first and second bolts 68, 72 to allow movement of the column jacket 12 in the telescoping direction. More specifically, the first bolt 68 is disposed through the first telescoping slot 30 and the second bolt 72 is disposed through the second telescoping slot 32.

Further, at least one of the first and second bolts 68, 72 are disposed through the raking slot 22 for allowing movement of the column jacket 12 in the raking direction. More specifically, the first and second bolts 68, 72 are disposed through the raking slot 22 with the raking slot 22 extending transverse to the first and second pivot axes $P_1$, $P_2$. The first and second bolts 68, 72 travel along the first and second telescoping slots 30, 32 when adjusting the column jacket 12 in the telescoping direction and the first and second bolts 68, 72 travel along the raking slot 22 when adjusting the column jacket 12 in the raking direction. It is to be appreciated that both the first and second telescoping slots 30, 32 and the raking slot 22 are complementary in configuration to the first and second bolts 68, 72 for preventing play between the first and second bolts 68, 72, the raking slot 22, and the first and second telescoping slots 30, 32 while also allowing movement of the first and second bolts 68, 72 within the raking slot 22 and the first and second telescoping slots 30, 32 during adjustments of the column jacket 12. It is to be appreciated that a thrust bearing 76 may be coupled to each of the first and second bolts 68, 72 as known to those skilled in the art.

A lever 78 is mounted to one of the first and second gears 34, 38 and rotatable between a set position for preventing movement of the column jacket 12 and an adjustable position for allowing movement of the column jacket 12. The lever 78 is shown mounted to the first gear 34 and in the set position in FIGS. 1 and 4. The lever 78 is shown in the adjustable position in FIG. 3. As shown in FIG. 4, the telescope and rake brackets 14, 16 are disposed between the unitary cam member 44 and the back plate 64 such that rotation of the lever 78 to the set position allows the unitary cam member 44 to engage the rake bracket 16, the back plate 64 to engage the telescope bracket 14, and the base portion 28 to engage the vertical portion 20 for preventing movement of the column jacket 12. In other words, the unitary cam member 44 and the back plate 64 clamp the telescope and rake brackets 14, 16 together (i.e. apply the clamping pressure) for preventing movement of the column jacket 12. It is to be appreciated that the lever 78 may be integrally formed to one of the first and second gears 34, 38 or the lever 78 may be affixed to one of the first and second gears 34, 38 by any suitable method, such as welding, adhesive, etc.

The first and second gears 34, 38 may be configured to vary a gear ratio between each other for changing an amount of rotation of the lever 78 and/or for increasing the clamping pressure (i.e. a load) to clamp the telescope and rake brackets 14, 16 together without increasing an amount of effort (i.e. force) to rotate the lever 78. In other words, the configuration of the first and second gears 34, 38 may be the same or different depending on a desired amount of rotation (i.e. travel) of the lever 78 and/or a desired amount of clamping pressure. For example, the gear ratio between the first and second gears 34, 38 may be one to one, two to one, one to two, etc. It is to be appreciated that the adjustable steering column assembly 10 may include a positive lock mechanism (not shown) and/or an energy absorption mechanism (not shown) as known to those skilled in the art. The positive lock mechanism includes a block (not shown) having a plurality of teeth (not shown) which cooperates with a plurality of teeth (not shown) disposed in the raking slot 22 and the telescoping slot 30. The positive lock mechanism and the energy absorption mechanism may be utilized to increase crashworthiness of the adjustable steering column assembly 10 during the collision.

For illustrative purposes only, an example of the lever 78 moving between the set and adjustable positions and the cam mechanism 42 moving correspondingly is discussed below. When moving the lever 78 to the set position, the lever 78 and the first gear 34 rotate about the first pivot axis $P_1$ counter-clockwise and the second gear 38 rotates about the second pivot axis $P_2$ clockwise. The lever 78 is shown in the set position in FIGS. 1 and 4. The first and second extensions 58, 62 ride upwardly along the first and second cam surfaces 52, 54 respectively such that the unitary cam member 44 moves toward the rake bracket 16 and the back plate 64 moves toward the base portion 28 of the telescope bracket 14. In other words, the unitary cam member 44 and the back plate 64 move toward each other such that the unitary cam member 44 and the back plate 64 clamp the telescope and rake brackets 14, 16 together (i.e. apply the clamping pressure) for preventing movement of the column jacket 12 in the telescoping and raking directions. Specifically, the unitary cam member 44 frictionally engages the rake bracket 16 and both the rake bracket 16 and back plate 64 frictionally engage the base portion 28 of the telescope bracket 14 for preventing movement of the column jacket 12.

When moving the lever 78 to the adjustment position, the lever 78 and the first gear 34 rotate about the first pivot axis $P_1$ clockwise and the second gear 38 rotates about the second pivot axis $P_2$ counter-clockwise. The lever 78 is shown in the adjustment position in FIG. 3. The first and second extensions 58, 62 ride downwardly along the first and second cam surfaces 52, 54 respectively such that the unitary cam member 44 moves away from the rake bracket 16 and the back plate 64 moves away from the base portion 28 of the telescope bracket 14. In other words, the unitary cam member 44 and the back plate 64 move away from each other such that the unitary cam member 44 and the back plate 64 unclamp the telescope and rake brackets 14, 16 (i.e. remove the clamping pressure) for allowing movement of the column jacket 12 in the telescoping and raking directions. The cam mechanism 42, the first and second gears 34, 38, the first and second bolts 68, 72, the back plate 64, the lever 78, the telescope bracket 14 and the column jacket 12 move simultaneously or in unison when adjusting the column jacket 12 in the raking direction. In addition, the telescope bracket 14 and the column jacket 12 move independently of the cam mechanism 42, the first and second gears 34, 38, the first and second bolts 68, 72, and the back plate 64 when adjusting the column jacket 12 in the telescoping direction.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:
1. An adjustable steering column assembly for a vehicle, said assembly comprising:
   a column jacket defining a longitudinal axis and moveable in at least one of a telescoping direction and a raking direction;
   a telescope bracket with said column jacket mounted thereon;
   a rake bracket coupled to said telescope bracket;
   a first gear coupled to said rake bracket and defining a first pivot axis transverse to said longitudinal axis with said first gear rotatable about said first pivot axis and including a plurality of teeth;
   a second gear including a plurality of teeth meshing with said teeth of said first gear and defining a second pivot axis transverse to said longitudinal axis and spaced above said first pivot axis with said second gear coupled to said rake bracket and rotatable about said second pivot axis such that rotation of said first gear about said first pivot axis causes rotation of said second gear about said second pivot axis; and a cam mechanism coupled to said rake bracket and to each of said first and second gears with said cam mechanism movable along said first and second pivot axes during rotation of said first and second gears for selectively engaging said rake bracket to prevent movement of said column jacket in at least one of said telescoping and raking directions, wherein said cam mechanism includes a monolithic cam member defining an elongated configuration extending radially relative to said first and second pivot axes with said monolithic cam member coupled to each of said first and second gears, wherein said monolithic cam member includes a plurality of second cam surfaces spaced from each other about said second pivot axis.

2. An assembly as set forth in claim 1 wherein said monolithic cam member includes a plurality of first cam surfaces spaced from each other about said first pivot axis.

3. An assembly as set forth in claim 2 wherein said cam mechanism includes a first follower mounted to said first gear and having a plurality of first extensions extending along said first pivot axis with each of said first extensions engaging one of said first cam surfaces such that rotation of said first gear allows said first extensions to move along said first cam surfaces for moving said monolithic cam member along said first pivot axis.

4. An assembly as set forth in claim 1 wherein said cam mechanism includes a second follower mounted to said second gear and having a plurality of second extensions extending along said second pivot axis with each of said second extensions engaging one of said second cam surfaces such that rotation of said second gear allows said second extensions to move along said second cam surfaces for moving said monolithic cam member along said second pivot axis.

5. An assembly as set forth in claim 1 further including at least one back plate disposed between said column jacket and said telescope bracket with said back plate coupled to said monolithic cam member.

6. An assembly as set forth in claim 5 wherein said telescope bracket includes a pair of arms flanking and mounted to said column jacket to define a gap between said arms and said column jacket for receiving said back plate.

7. An assembly as set forth in claim 5 wherein said cam mechanism, said first and second gears, said back plate, said telescope bracket, and said column jacket move in unison when adjusting said column jacket in said raking direction.

8. An assembly as set forth in claim 7 wherein said telescope bracket and said column jacket move independently of said cam mechanism, said first and second gears, and said back plate when adjusting said column jacket in said telescoping direction.

9. An assembly as set forth in claim 5 further including a lever mounted to one of said first and second gears and rotatable between a set position for preventing movement of said column jacket and an adjustable position for allowing movement of said column jacket.

10. An assembly as set forth in claim 9 wherein said telescope and rake brackets are disposed between said monolithic cam member and said back plate such that rotation of said lever to said set position allows said monolithic cam member to engage said rake bracket and said back plate to engage said telescope bracket for preventing movement of said column jacket.

11. An assembly as set forth in claim 1 wherein said rake bracket includes a horizontal portion and a vertical portion extending downwardly relative to said horizontal portion with said telescope bracket coupled to said vertical portion.

12. An assembly as set forth in claim 11 wherein said vertical portion defines at least one raking slot extending transverse to said first and second pivot axes for allowing movement of said column jacket in said raking direction.

13. An assembly as set forth in claim 12 wherein said monolithic cam member defines a first width and said raking slot defines a second width with said first width greater than said second width for allowing said monolithic cam member to engage said vertical portion.

14. An assembly as set forth in claim 1 further including at least one back plate disposed between said column jacket and said telescope bracket.

15. An assembly as set forth in claim 14 further including a first bolt disposed along said first pivot axis and through said telescope and rake brackets for coupling said first gear to said cam mechanism, said back plate, and said telescope and rake brackets.

16. An assembly as set forth in claim 15 further including a second bolt disposed along said second pivot axis and through said telescope and rake brackets for coupling said second gear to said cam mechanism, said back plate, and said telescope and rake brackets.

17. An assembly as set forth in claim 16 wherein said telescope bracket includes a base portion selectively engaging said rake bracket and defining at least one telescoping slot extending along said longitudinal axis for receiving one of said first and second bolts to allow movement of said column jacket in said telescoping direction.

18. An assembly as set forth in claim 17 wherein said at least one telescoping slot is further defined as a first telescoping slot and further includes a second telescoping slot spaced above said first telescoping slot with said first bolt disposed through said first telescoping slot and said second bolt disposed through said second telescoping slot.

* * * * *